United States Patent [19]

Hambley

[11] Patent Number: 4,715,047
[45] Date of Patent: Dec. 22, 1987

[54] DIGITAL DIFFERENTIAL PHASE SHIFT KEYED DEMODULATOR

[75] Inventor: Allan R. Hambley, Atlantic Mine, Mich.

[73] Assignee: Harris Corporation, Melbourne, Fla.

[21] Appl. No.: 848,063

[22] Filed: Apr. 4, 1986

[51] Int. Cl.$^4$ ............................................. H04L 27/22
[52] U.S. Cl. ....................................... 375/84; 329/124; 370/12
[58] Field of Search ....................... 375/83, 84, 85, 86; 329/105, 110, 112, 124; 455/205, 214; 370/12

[56] References Cited

U.S. PATENT DOCUMENTS

| | | | |
|---|---|---|---|
| 3,983,499 | 9/1976 | Tan | 329/112 |
| 3,997,847 | 12/1976 | Tong | 329/105 |
| 4,007,331 | 2/1977 | Flanagan | 375/84 |
| 4,010,323 | 3/1977 | Peck | 375/84 |
| 4,096,442 | 6/1978 | McRae et al. | 375/86 |
| 4,121,050 | 10/1978 | Witt | 375/86 |
| 4,501,002 | 2/1985 | Auchterlonie | 375/86 |
| 4,546,322 | 10/1985 | Crutcher | 329/124 |
| 4,566,100 | 1/1986 | Mizuno et al. | 375/86 |

Primary Examiner—Robert L. Griffin
Assistant Examiner—Stephen Chin
Attorney, Agent, or Firm—John L. DeAngelis, Jr.

[57] ABSTRACT

A differential phase shift keyed demodulator for demodulating a differential phase shift key modulated signal and synchronizing the clock thereof. To accomplish the demodulation, the differential phase shift keyed modulated signal is mixed with three reference signals offset by 120°. This process creates three threshold boundaries in the XY vector phase plane and the three mixed signals are logically related to determine in which sector the instantaneous phase lies. The instantaneous phase at a first time is delayed for comparison with the instantaneous phase at a successive time. The result of this comparison process produces a signal representing the information. Synchronization of the data clock is accomplished by comparing the phase of the signal resulting from the demodulation at points midway between data decisions. The resulting signal from this comparison process controls a voltage-controlled oscillator such that when the clock is early the frequency of the voltage-controlled oscillator tends to increase, and when the clock is late the frequency of the voltage-controlled oscillator tends to decrease.

33 Claims, 10 Drawing Figures

DIGITAL DIFFERENTIAL PHASE SHIFT KEYED DEMODULATOR

FIELD OF THE INVENTION

This invention relates to an apparatus and method for demodulating a differential phase shift keyed signal.

BACKGROUND OF THE INVENTION

Phase shift keying (PSK) is a form of modulation where the phase of a carrier is changed by binary data, and demodulation is accomplished by comparing the received signal to a fixed reference. In binary phase shift keying (BPSK), the modulator output has two phases. It is either in-phase or 180° out-of-phase, with the local oscillator, depending on whether the input is a logic one or zero. To demodulate a BPSK signal it is necessary for the demodulator to establish a reference phase angle. This reference is compared to the phase angle of the received signal to determine whether the received signal represents a one or a zero.

An alternative to PSK is differential phase shift keying (DPSK). In a DPSK signal the information is contained in the differential phase between consecutive bit intervals. With this technique, the received signal is demodulated by comparing the carrier signal phase in each bit interval with the phase during the immediately preceding bit interval, the latter serving as a reference. Binary DPSK, which is the most popular form of DPSK, uses two phase angles to represent the data. Although DPSK is easier to implement than PSK, DPSK requires a greater signal-to-noise ratio to achieve the same error rate as PSK.

Quadrature DPSK modulation (the use of eight phase angles to represent data) is discussed in U.S. Pat. No. 3,368,036, entitled "Demultiplexing and Detecting System for Predicted Wave Phase-Pulsed Data Transmission System" issued to R. C. Carter et al. The patented invention permits two bits of binary data to be transmitted and received per bit interval because with quadrature DPSK the carrier signal in a given bit interval can assume any one of four different phases with respect to the immediately preceding bit interval.

Figure 1:
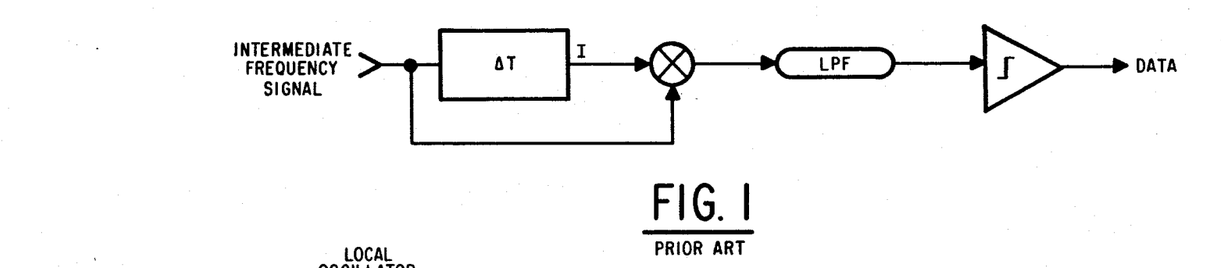
FIGS. 1 through 3 illustrate prior art DPSK demodulators.

FIG. 1 illustrates a prior art DPSK demodulator that uses a delay element ($\Delta t$) at the intermediate frequency. The delay element must be equal to one bit period and must represent a whole number of carrier cycles. The output of the delay element is multiplied or mixed with the undelayed intermediate frequency signal to synchronously demodulate the signal. In mathathical terms the intermediate frequency signal will be $+\sin \omega_c t$ or $-\sin \omega_c t$. Since the mixer in FIG. 1 produces the product of two successive values of the intermediate frequency input signal, the output signal thereof will be $\sin^2\omega_c t = (\frac{1}{2})(1-\cos 2\omega_c t)$ when two consecutive phases are the same, or $-\sin^2\omega_c t = -(\frac{1}{2})(1-\cos 2\omega_c t)$ when two consecutive phases are different. The low-pass filter elminates the double-frequency component, yielding either a positive or negative dc value. The dc value is then one-bit-quantized by a zero crossing detector or comparator. This detection scheme offers simplicity in concept but is extremely difficult to implement because the delay element must have a very accurate delay, no more than ±10 degrees of phase shift at the intermediate frequency.

Figure 2:
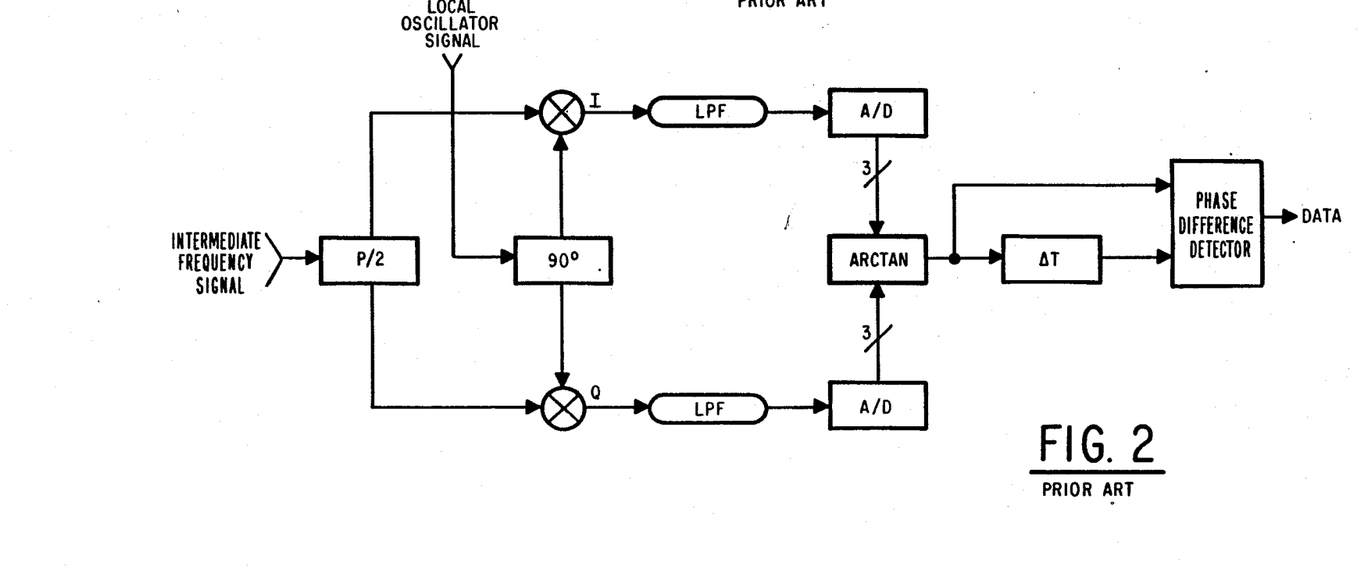

FIG. 2 illustrates another prior art DPSK detector wherein the intermediate frequency signal is reduced to quadrature baseband components, labeled I and Q; the baseband components are then converted to a phase angle via an arc-tangent function. The result from the arc-tangent function is delayed and compared to determine the phase difference, which represents the desired data. The analog/digital interfaces are shown in FIG. 2 as occurring after baseband conversion and filtering so that the arc-tangent function can be done in a primarily digital circuit.

Figure 3:
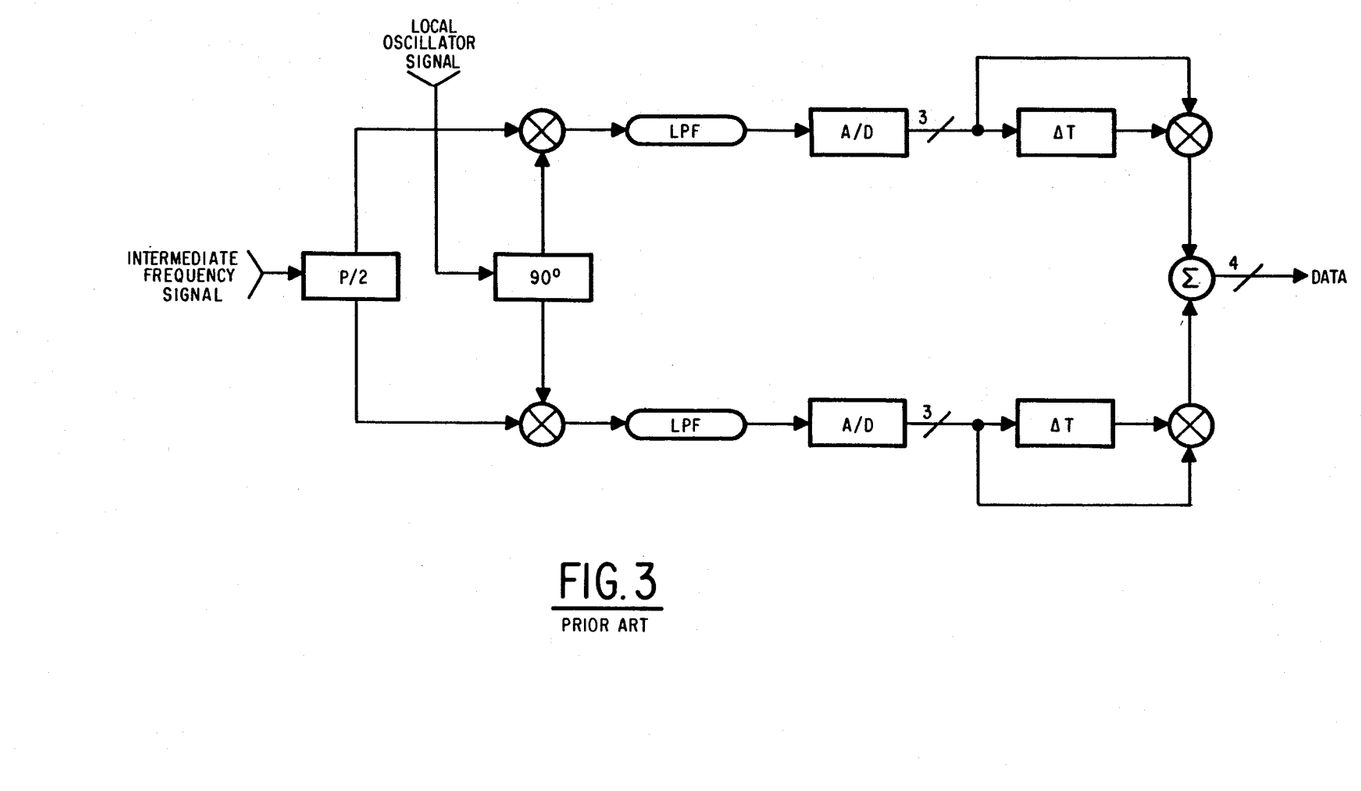

Another prior art DPSK detector is illustrated in FIG. 3. In the FIG. 3 detector the arc-tangent function, which is quite difficult to implement, is eliminated in favor of a delay, multiply, and add circuit that provides simpler circuitry with substantially similar performance to the FIG. 2 embodiment. Both of the FIG. 2 and FIG. 3 embodiments can be characterized as amplitude-quantized in that they are sensitive to the amplitudes of the quadrature baseband components. Thus for digital processing a pair of analog-to-digital converters are necessary to implement the circuits.

SUMMARY OF THE INVENTION

The DPSK demodulator of the present invention is distinguishable from the prior art discussed above in the manner in which the sampled estimates of signal phase are converted to digital form, and the relative simplicity of the digital circuitry required for the phase comparisons. Also, relative to the embodiments employing analog time delay circuits, the demodulator of the present invention can operate at variable data rates because the delay needed to enable the phase comparisons is attained using flip-flops rather than analog delay elements. Further, depending on the delay time desired, it may not be possible to implement analog delay lines on an integrated circuit, thus the present invention is capable of being embodied in one or more integrated circuits.

The detector or demodulator of the present invention mixes the incoming intermediate frequency signal to baseband with three local oscillator signals having 120° phase differences. After low-pass filtering, the baseband signals are one-bit quantized via zero crossing detectors (or comparators) to produce three binary bits describing the carrier signal phase angle in 120° increments. Each of these bits is then DPSK-detected through a delay and modulo-2 multiplication prior to the phase decision. Simple majority logic then determines whether the phase difference from bit to bit represents 0° or 180°.

BRIEF DESCRIPTION OF THE DRAWINGS

The present invention may be better understood, and the further advantages and uses thereof more readily apparent when considered in view of the following detailed description of exemplary embodiments, taken with the accompanying figures in which.

DESCRIPTION OF THE PREFERRED EMBODIMENTS

Figure 4:
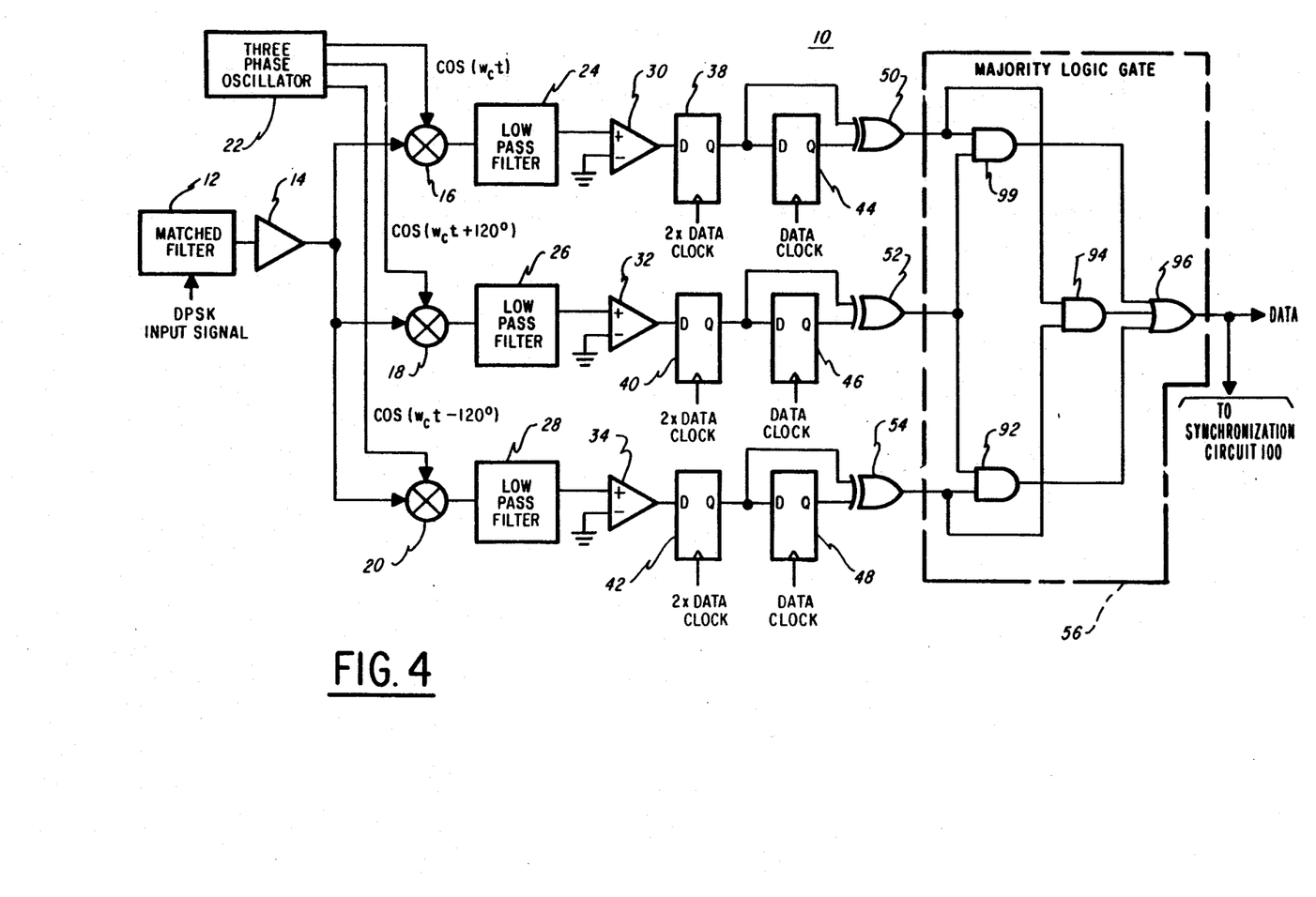
FIG. 4 illustrates a DPSK demodulator constructed according to the teachings of the present invention.

FIG. 4 is a schematic representation of a DPSK demodulator 10 constructed according to the teachings of the present invention. The DPSK demodulator 10 is different from the prior art designs in the manner in which sampled estimates of the signal phase are converted to digital form and the relatively simple digital circuitry required for the phase comparison process. The demodulator is an improvement over the prior art DPSK demodulators that use analog delay elements or that digitize the input signal and use complex signal processing algorithms. The DPSK demodulator 10 can operate at variable data rates because the delay needed to enable phase comparisons at the beginning and end of a bit interval is accomplished by flip flops rather than analog delay elements.

Figure 5A:
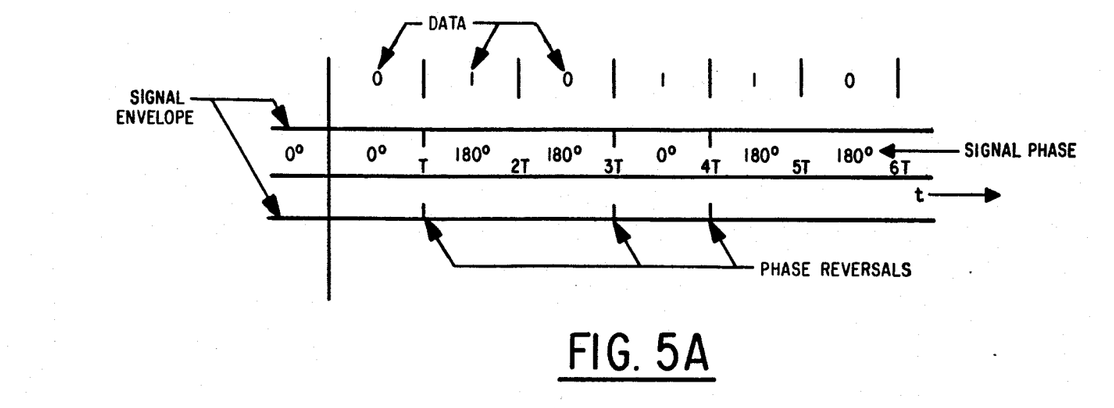
FIGS. 5A and 5B illustrate the input and output signals for the matched filter of FIG. 4.

FIG. 5A shows a representative noise-free DPSK signal waveform envelope at the input to a matched filter 12 of FIG. 4. The input signal consists of a sinusoid at a frequency $f_c$ whose phase has been inverted at periodic intervals to modulate the data (the information signal) onto the carrier signal. The phase reversals are indicated in FIG. 5A by the 0° and 180° indicators. In the signal of FIG. 5A the phase is inverted at the beginning of a data interval when the data bit for that interval is a one and the phase remains the same as in the previous interval when the data bit for that interval is a zero. If the opposite convention is used (phase inversion on a zero rather than a one), the DPSK demodulator 10 will still provide correct demodulation. The following discussion of the DPSK demodulator 10 assumes signal inversion when the data is a one, even though the DPSK demodulator 10 operates correctly with either convention, provided that the output information signal is selected from the appropriate output terminal.

Figure 5B:
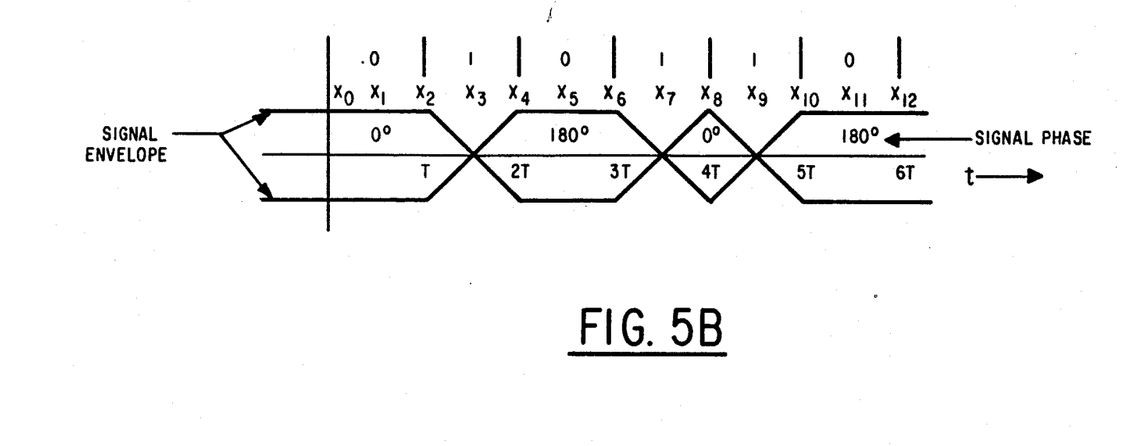

FIG. 5B shows the corresponding noise-free output signal from the matched filter 12. When a phase reversal occurs in the input signal to the matched filter 12, the energy storage elements thereof cause the output amplitude to decay to zero and then return back to the peak amplitude, of the opposite phase. It is well known that the optimum method for demodulating a DPSK signal is to compare the phases of the matched filter output signal at the end of each bit interval. These points are designated in FIG. 5B as $X_0$, $X_2$, $X_4$, $X_6$, $X_8$, $X_{10}$, and $X_{12}$. For example, if the phases at $X_2$ and $X_4$ are compared and the phase difference is greater than 90°, the data bit (or information signal) for the interval between $X_2$ and $X_4$ is a one. If the phase difference is less than 90°, the data bit is a zero. Noise disturbs the phase of the output signal from the matched filter 12 so that a statistical distribution of phase differences may be observed. The noise causes phase jitter that can disrupt the phase difference between $X_2$ and $X_4$, producing an erroneous data bit.

Returning to the DPSK demodulator 10 of FIG. 4, the output signal from the matched filter 12 is fed through a buffer amplifier 14 to three mixers 16, 18, and 20. The mixers 16, 18, and 20 are each responsive to a reference signal from a three-phase oscillator 22. As indicated on FIG. 4, the mixer 16 is responsive to a signal cos ($\omega_c t$) from the three-phase oscillator 22; the mixer 18 is responsive to a signal cos($\omega_c t$+120°) from the three-phase oscillator 22; the mixer 20 is responsive to a signal cos($\omega_c t$−120°) from the three-phase oscillator 22. The three signals from the three-phase oscillator 22 have the same frequency, but different phase angles of 0°, +120°, and −120°. The resultant signal from the mixer 16, which includes a dc term and a double-frequency term, is input to a low-pass filter 24. Similarly, the resultant signals from the mixers 18 and 20 are input respectively to low-pass filters 26 and 28. The low-pass filters 24, 26, and 28 reject signal components in the vicinity of twice the carrier frequency, leaving only the dc value.

The output signal from each of the low-pass filters 24, 26, and 28 is provided as an input to a non-inverting input terminal of a comparator (or a zero-crossing detector) 30, 32, and 34, respectively. The inverting input terminal of each comparator 30, 32, and 34 is connected to ground. Each comparator 30, 32, and 34 compares the dc value from the respective low-pass filter with zero. The output signal from the comparator 30 is high if the instantaneous phase of the signal from the matched filter 12 is between −90° and +90°. The output signal from the comparator 30 is low if the instantaneous phase of the input signal is between 90° and 270°. That is, the comparator 30 provides an indication that is high (a logical one) if the phase is to the right of the vertical line shown in the XY vector phase plane of FIG. 6. This result is illustrated by the following equations, where cos($\omega_c t$) is the reference signal and cos ($\omega_c t$+45°) is the signal from the matched filter 12. The mixer 16 produces an output signal $$\cos \omega_c t(\cos \omega_c t + 45°) = \cos \omega_c t(\cos \omega_c t \cdot \cos 45° - \quad (1)$$

$$\sin \omega_c t \cdot \sin 45°)$$

$$= .707(\cos^2 \omega_c t - \cos \omega_c t \cdot \sin \omega_c t)$$

$$= .707((\tfrac{1}{2}) + (\tfrac{1}{2}) \cos 2\omega_c t -$$

$$(\tfrac{1}{2})\sin(\omega_c t - \omega_c t) - (\tfrac{1}{2})\sin(2\omega_c t))$$

$$= .707((\tfrac{1}{2}) + (\tfrac{1}{2}) \cos(2\omega_c t) - (\tfrac{1}{2}) \cdot (2\omega_c t))$$

The double frequency terms in equation (1) are removed by the low pass filter 24, leaving a dc value of 0.353. This value is applied to the non-inverting input terminal of the comparator 30 to produce a high signal at the output terminal thereof.

For all phase angles between −90° and +90° (i.e., to the right of the vertical line in FIG. 6) the result of the computations shown above is between 1 and 0. Thus, when the phase angle is to the right of the vertical line in FIG. 6 the comparator 30 has a positive value at its non-inverting input terminal and produces a high output signal. When the signal phase is to the left of the vertical line in FIG. 6 the comparator 30 has a negative value at its non-inverting input terminal and produces a low output signal. If the phase should fall exactly on the vertical line of FIG. 6 the signal to the non-inverting input terminal of the comparator 30 is zero and the output signal is indeterminate. However, the probability of this occurance is essentially zero, so the impact on the error rate of the demodulator 10 can be neglected.

Figure 6:
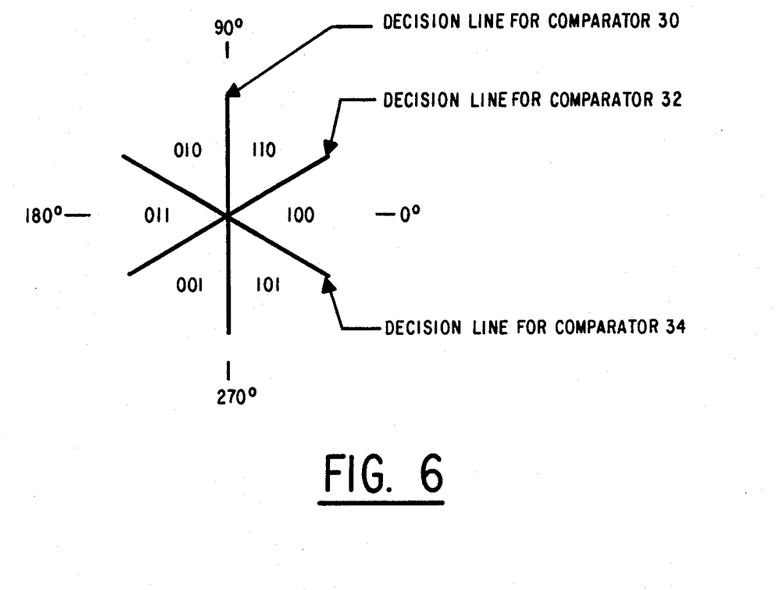
FIG. 6 is a phase diagram illustrating the various codes produced by the DPSK demodulator of FIG. 4 and the phase angles represented by those codes.

In a similar fashion, two other decision lines are created by the comparators 32 and 34. See FIG. 6. The comparator 32 produces a high output signal when the phase angle is above the decision line running from 30° to 210°. The comparator 34 produces a high output signal when the phase angle is below the decision line that runs from 330° to 150°. As a result, the output of the comparators 30, 32, and 34 is a three-bit code that indicates in which one of the six sectors the instantaneous phase is located. The sectors and the corresponding three-bit codes are shown in FIG. 6. The bits in the code from left to right correspond to the comparator outputs 30, 32, and 34.

The output signals from the comparators 30, 32, and 34 are input to flip-flops 38, 40, and 42, respectively. The flip-flops 38, 40, and 42 are clocked at twice the data rate as indicated. Therefore, the three-bits appearing at the outputs of the flip-flops 38, 40, and 42 represent the phase of the filtered DPSK signal at times $X_0$, $X_1$, $X_2$, $X_3$, etc. The output signals from the flip-flops 38, 40, and 42 are connected to the inputs of a second set of flip-flops designated 44, 46, and 48. The flip-flops 44, 46, and 48 are clocked at the data rate, as shown. The output signals from the flip-flops 44, 46, and 48 represent the phase of the filtered DPSK signal at $X_0$, $X_2$, $X_4$, etc. The output signal from the flip-flop 38 is connected to a first input terminal of an exclusive OR gate 50; the output signal from the flip-flop 44 is connected to a second input terminal thereof. The output signal from the flip-flop 40 is connected to a first input terminal of an exclusive OR gate 52; the output signal from the flip-flop 46 is connected to a second input terminal thereof. The output signal from the flip-flop 42 is connected to a first input terminal of an exclusive OR gate 54; the output signal from the flip-flop 48 is connected to a second input terminal thereof.

The output terminals from the exclusive OR gates 50, 52, and 54 are connected to a majority logic gate 56. The majority logic gate 56 produces a high output signal if the three input bits contain two or three logical ones. The output signal from the majority logic gate 56 is zero if the three input bits contain a single logical one or no logical ones. Thus, the output signal from the majority logic gate 56 is a comparison of the filtered DPSK signal phase at two points in time and represents the information signal that modulated the carrier signal at the transmitter. As will be discussed further herein below, there is also sufficient information in the recovered data signal to synchronize the data clock.

In another embodiment where it is not desired to produce a clock synchronization signal in addition to demodulating the input signal, the flip-flops 38, 40, and 42 are unnecessary. To demodulate the input signal, it is only necessary that the bit decisions be made at the beginning and end of each bit interval. The flip-flops 44, 46, and 48 are sufficient to accomplish this.

As discussed above, the output signals from the comparators 30, 32, and 34 represent a three-bit code indicating the sector of FIG. 6 where the instantaneous phase of the filtered DPSK signal lies. The flip-flops 38, 40, and 42 are clocked at twice the data rate so that the output signal from each of these flip-flops is the coded phase angles at $X_0$, $X_1$, $X_2$, $X_3$, etc. in FIG. 5B. Because the flip-flops 44, 46, and 48 are clocked at the data rate, their outputs represent the instantaneous phases at times $X_0$, $X_2$, $X_4$, etc. The time alignment of the output signals from the flip-flops 38, 40, 42, 44, 46 and 48 is shown in Table 1 below. The times in the first column of Table 1 denote half-bit time intervals, and refer to the instantaneous time designated by the subscripts of "X" in FIG. 5B.

TABLE 1

| Time | Output of Flip Flops 38, 40, and 42 | Output of Flip Flops 44, 46, and 48 |
|---|---|---|
| 0 | $X_0$ | — |
| 1 | $X_1$ | $X_0$ |
| 2 | $X_2$ | $X_0$ |
| 3 | $X_3$ | $X_2$ |
| 4 | $X_4$ | $X_2$ |
| 5 | $X_5$ | $X_4$ |
| 6 | $X_6$ | $X_4$ |
| 7 | $X_7$ | $X_6$ |
| 8 | $X_8$ | $X_6$ |
| 9 | $X_9$ | $X_8$ |
| 10 | $X_{10}$ | $X_8$ |
| 11 | $x_{11}$ | $x_{10}$ |

In the preferred embodiment, data decisions (i.e., determination of the transmitted information based on phase reversals) is derived from comparison of the output signals from the flip-flops 38, 40, 42, 44, 46, and 48 during the even time intervals shown in Table 1. Clock synchronization is derived during odd intervals. For example, at time 4 signals representing the phase at $X_2$ and $X_4$ (see FIG. 5B) appear at the output terminals of the flip-flops 38, 40, 42, 44, 46, and 48. Referring to FIG. 5B, the phase of the filtered DPSK signal at $X_2$ is 0°, so $X_2$ is coded as 100 as shown in FIG. 6. Similarly, the phase for $X_4$ is 180°, so $X_4$ is represented by the code 011. During the time 4, $X_2$ and $X_4$ are input to the exclusive OR gates 50, 52, and 54. The output signal from the exclusive OR gates 50, 52, and 54 is 111, which is input to the majority logic gate 56. The majority logic gate 56 decodes this information and produces a one bit at the output terminal thereof. A one bit is the correct data bit for the interval between $X_2$ and $X_4$ as shown in FIG. 5B. The correct data bit is also obtained from the majority logic gate 56 when noise causes a single bit error (and also some multiple bit error patterns) in the phase at $X_2$ or $X_4$. This is indicated in Table 2 below where erroneous bits are underlined.

TABLE 2

| $X_2$ | $X_4$ | XOR Outputs | Majority Logic Output (Data) |
|---|---|---|---|
| 100 | 011 | 111 | 1 |
| 0̲00 | 011 | 011 | 1 |
| 10̲1 | 011 | 110 | 1 |
| 11̲0 | 011 | 101 | 1 |
| 101 | 01̲0 | 111 | 1 |

The first row of Table 2 shows the error-free case described above. The second row shows the results when the first bit of $X_2$ is incorrect due to noise in the received signal. Noise can cause phase jitter that can change the ideal-case 180° phase difference between times $X_2$ and $X_4$. There are many other possibilities where the phase of the filtered DPSK signal can fall into an erroneous sector that is separated by a single bit from the correct sector in FIG. 6. The correct data bit is obtained, however, provided that the noise is not large enough to cause certain multiple-bit error patterns in the phase codes shown in FIG. 6.

Returning to FIG. 4, note that the majority logic gate 56 includes AND gates 90, 92, and 94. The AND gate 90 is responsive to the output signals from the exclusive OR gates 50 and 52. The AND gate 92 is responsive to the output signals from the exclusive OR gates 52 and 54. The AND gate 94 is responsive to the output signals from the exclusive OR gates 50 and 54. An OR gate 96 is responsive to the output signal from the AND gate 90, the AND gate 94, and the AND gate 92. The data signal is produced at the output terminal of the OR gate 96. The output signal from the majority logic gate 56 represents the bit occurring most frequently in the three-bit sequence provided as a an input thereto.

Figure 7:
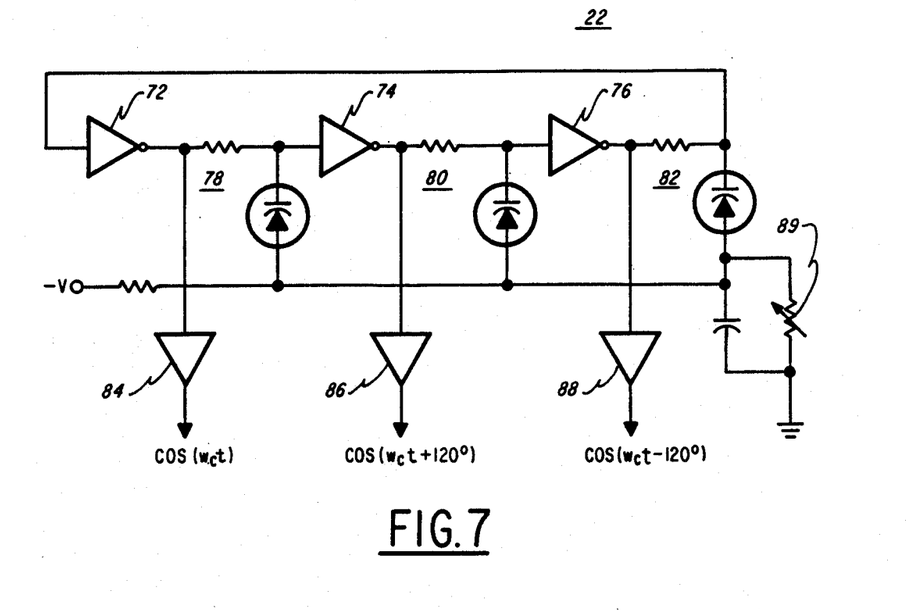
FIG. 7 is a schematic representation of the three-phase oscillator shown in FIG. 4.

A preferred embodiment for the three-phase oscillator 22 is shown in FIG. 7. The three-phase oscillator 22 comprises three identical subsections connected in a ring configuration, with each subsection consisting of an inverting amplifier and an RC phase shift circuit. The inverting amplifiers are identified by reference characters 72, 74, and 76; the RC phase shifts circuits are identified by reference characters 78, 80, and 82. The three-phase oscillator 22 oscillates at a frequency where the total phase shift around the ring is 360°, meaning that the phase shift for each subsection is 120°. If the signal at the output of the inverting amplifier 72 is taken as the 0° reference, then the signal at the output terminal of the second inverting amplifier 74 is plus 120°, and the signal at the output terminal of the inverting amplifier 76 is −120°. These three output signals are amplified by, respectively, buffer amplifiers 84, 86, and 88 to produce the three output signals shown. A variable resistor 89 adjusts the frequency of the three-phase oscillator 22. As is well known by those skilled in the art, the reference signals shown in FIGS. 4 and 7 can also be derived using a local oscillator and phase shifting devices to provide the phase shifted signals.

Figure 8A:
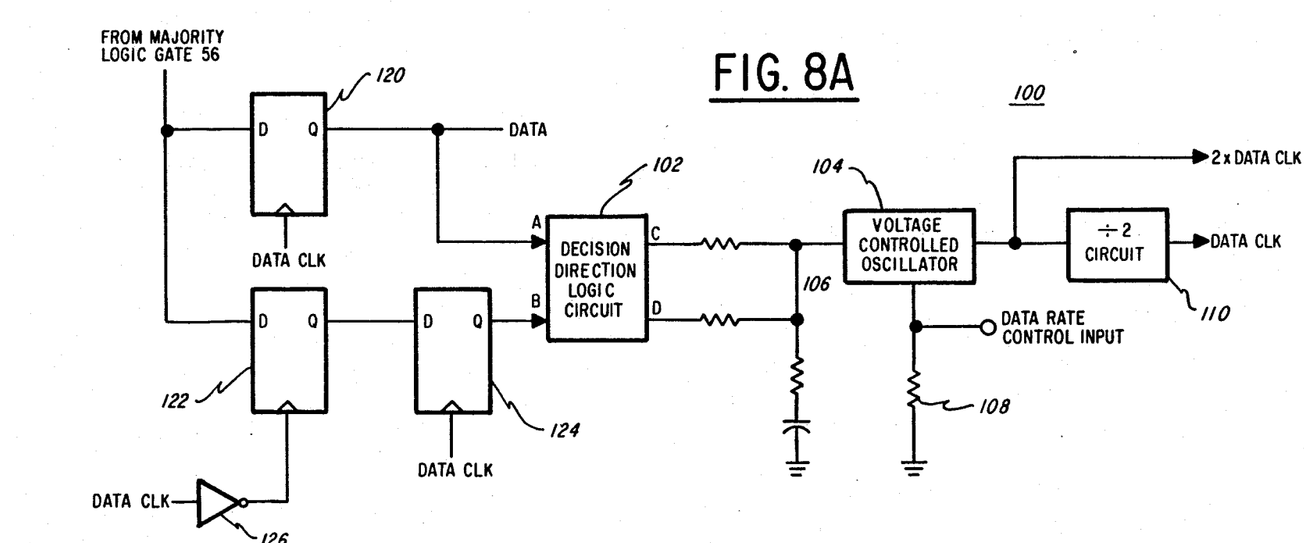
FIGS. 8A and 8B illustrate a synchronization circuit and an attendant truth table for the DPSK demodulator of FIG. 4.

A synchronization circuit 100, for synchronizing the data clock of the demodulator 10 is illustrated in FIG. 8A. An error signal is obtained in the synchronization circuit 100 by comparing the phase of the filtered DPSK signal at points midway between data decisions with the phase at the data decision points. Referring to FIG. 5B, when the data clock is properly timed the phase at $X_3$ is indeterminate. However, when the clock is early the phase at $X_3$ tends to agree with the phase at $X_2$. When the clock is late, the phase at $X_3$ tends to disagree with the phase at $X_2$. Therefore, a timing error signal can be obtained by comparing the phase at $X_3$ with the phase at $X_2$.

Referring to Table 1, the output signal from the majority logic gate 56 during time 3 represents a comparison of the phase at $X_3$ with the phase at $X_2$. Thus, the output signal from the majority logic gate 56 tends to be high for this interval when the timing is late. Similarly, the output signal tends to be low when the timing is early. When no phase transition occurs in the input DPSK signal, the timing information is not available and this is indicated by the fact that the data bit is a 0.

Flip-flops 120, 122 and 124 (see FIG. 8A) operate to provide the appropriate timing signals for synchronizing the data clock. The flip-flops 120 and 122 are responsive to the output signal from the majority logic gate 56 (i.e., the data signal). The flip-flop 120 is clocked by the data clock so that the output signal at the Q output terminal thereof represents the information signal (i.e., the signal at times $X_0$, $X_2$, $X_4$, etc.). The flip-flop 122 is clocked by an inverted data clock (via an inverter 126) so that the output signal at the Q terminal thereof represents the data signal at the mid-bit times (i.e., the signal at times $X_1$, $X_3$, $X_5$, etc.). The flip-flop 124 is clocked at the data rate and is responsive to the output signal from the flip-flop 122 for delaying the signal input thereto. Thus, the flip-flops 122, 124, and 126 time-align the signals at times $X_0$, $X_2$, $X_4$, etc. with the signals at times $X_1$, $X_3$, $X_5$, etc.

Figure 8B:
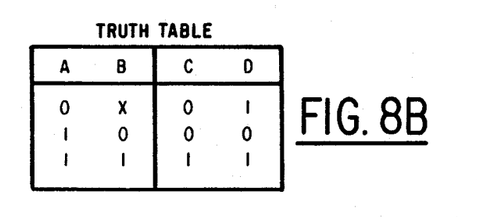

A decision direction logic circuit 102 of the synchronization circuit 100 combines the data decision (at times $X_0$, $X_2$, $X_4$, etc. from the flip-flop 120) at an A input terminal thereof with the mid-bit phase comparison decision (at times $X_1$, $X_3$, $X_5$, etc. from the flip-flop 124) at a B input terminal thereof to produce two control signals for controlling a voltage-controlled oscillator 104. The control signals are designated C and D. As indicated in the truth table of FIG. 8B, when the A input terminal (data) is a 0, the C output terminal is 0 and the D output terminal is 1. The C and D output terminals offset one another so no speed-up or slow-down of the voltage controlled oscillator 104 occurs. This is necessary because when the data bit (at the A input terminal) is a 0, no phase transition of the DPSK signal has occurred and therefore, no timing information is available. When the A input terminal is a 1 and the B input terminal is a 0, the C and D output terminals are both zeros, tending to cause a slowdown of the voltage-controlled oscillator 104. This is appropriate because a mid-bit decision of zero indicates that the data clock timing is early. If the A and B input terminals are both 1, then the C and D output terminals are both 1, causing a speedup of the voltage-controlled oscillator 104. An RC network 106 connected between the output terminal of the decision directional logic circuit 102 and the voltage-controlled oscillator 104 forms a loop filter. The loop filter smooths the input signal to the voltage-controlled oscillator 104 so that the timing is not substantially affected by noise and maintains proper clock timing for short intervals when transitions are absent from the DPSK waveform, for example at time interval $X_5$ illustrated in FIG. 5B.

The voltage controlled oscillator 104 operates at twice the data rate because in the embodiment of FIG. 4 the flip-flops 38, 40, and 42 require timing signals at twice the data rate. In one embodiment of the present invention, the voltage-controlled oscillator 104 operates over a range of desired data rates from 200 through 500 Mbit/sec. These data rates are accomplished by appropriate selection of the value for a resistor 108 or by providing an external control voltage to select the center frequency of the voltage-controlled oscillator 104 for different data rates. The external control is designated the data rate control input in FIG. 8A. The output signal from the voltage-controlled oscillator 104 is input to a divide-by-two circuit 110 to provide a data frequency clock signal. In one embodiment the divide-by-two circuit is implemented using a flip-flop.

While I have shown and described several embodiments in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are obvious to one of ordinary skill in the art.

What is claimed is:

1. A differential phase shift keyed demodulator for recovering information from a phase modulated signal, comprising:
   first means for dividing the XY vector phase plane into a plurality of sectors, wherein each one of said plurality of sectors is assigned a code, and for determining the sector in which the instantaneous phase of the phase modulated signal lies at a given time; and second means for comparing the instantaneous phase of the phase modulated signal at successive times, by comparing the sector code in which the instantaneous phase of the phase modulated signal lies at successive times wherein the phase difference as determined by the phase modulated signal being in different sectors, represents the information.

2. The differential phase shift keyed demodulator of claim 1 wherein the first means includes:
means for generating a plurality of threshold boundaries passing through the origin of the XY vector phase plane, wherein each threshold boundary divides the XY vector phase plane into two half-plane segments;
for each one of said plurality of threshold boundaries, means for determining in which half-plane segment the instantaneous phase lies such that the overlapping area of the half-plane segments in which the instantaneous phase lies identifies the sector of the XY vector phase plane in which the instantaneous phase lies.

3. The differential phase shift keyed demodulator of claim 2 wherein the plurality of threshold boundaries include three threshold boundaries offset by 120°.

4. The differential phase shift keyed demodulator of claim 2 wherein the first means includes:
oscillator means for producing a plurality of reference signals wherein there is a predetermined phase angle between each reference signal;
a plurality of mixer means, wherein each mixer means is responsive to one of said plurality of reference signals and to the phase modulated signal for producing a mixed signal; and
a plurality of threshold detector means, wherein each threshold detector means is responsive to one of said plurality of mixed signals, for producing a threshold signal, wherein the aggregate of said plurality of threshold signals indicates the half-plane segment in which the instantaneous phase lies.

5. The differential phase shift keyed demodulator of claim 4, wherein the plurality of reference signals includes three reference signals with a 120° phase difference between each reference signal, and wherein the plurality of mixer means includes three mixer means, and wherein the plurality of threshold detector means includes three threshold detectors, wherein each threshold detector means includes a non-inverting input terminal responsive to the mixed signal from the corresponding mixer and an inverting input terminal connected to ground.

6. The differential phase shift keyed demodulator of claim 4 wherein the second means includes:
a plurality of delay means wherein each delay means is responsive to one of said plurality of threshold signals for producing a delayed threshold signal; and
logic means responsive to each of said plurality of delayed threshold signals representing the instantaneous phase at a first identifiable time, and responsive to the threshold signals representing the instantaneous phase at a second identifiable time, for logically relating said signals input thereto and for producing a signal representing the information.

7. The differential phase shift keyed demodulator of claim 6 wherein the information signal includes a plurality of bits and each one of the plurality of delay means provides a delay time equal to one bit time.

8. The differential phase shift keyed demodulator of claim 6 wherein the delayed threshold signal representing the instantaneous phase at the first identifiable time and the threshold signal representing the instantaneous phase at the second identifiable time are binary signals, and wherein the logic means performs modulo-2 addition, and wherein the logic means performs a majority detection on the modulo-2 sums for determining the majority binary bit in the modulo-2 sums, wherein the majority binary bit represents the information.

9. The differential phase shift keyed demodulator of claim 8 wherein the modulo-2 addition is performed by exclusive OR gates.

10. A differential phase shift keyed demodulator for recovering information from a phase modulated signal and for synchronizing the internal clock signal thereof, said differential phase shift keyed demodulator comprising:
first means for dividing the XY vector phase plane into a plurality of sectors and for determining the sector in which the instantaneous phase of the phase modulated signal lies, wherein each one of said plurality of sectors is assigned a code;
second means for comparing the sector code in which the instantaneous phase lies at successive predetermined times for producing a data signal representing the information; and
third means for determining the sector in which the instantaneous phase lies at successive predetermined times, wherein the result synchronizes the clock signal of said differential phase shift keyed demodulator.

11. The differential phase shift keyed demodulator of claim 10 wherein the first means includes:
means for generating a plurality of threshold boundaries passing through the origin of the XY vector phase plane, wherein each threshold boundary divides the XY vector phase plane into two half-plane segments; and
for each of said threshold boundaries, means for determining in which half plane segment the instantaneous phase lies such that the overlapping area of the half-plane segments in which the instantaneous phase lies identifies the sector of the XY vector phase plane in which the instantaneous phase lies, and for producing a plurality of binary signals, wherein each of said plurality of binary signals represents the half-plane segment in which the instantaneous phase lies.

12. The differential phase shift keyed demodulator of claim 11 wherein the second means includes:
a first plurality of digital delay means, wherein each digital delay means is responsive to the binary signal representing the half-plane segment in which the instantaneous phase lies, and wherein each of said first plurality of digital delay means produces a first delayed signal, and wherein each of said first plurality of digital delay means is clocked at twice the data rate;
a second plurality of digital delay means wherein each of said digital delay means is responsive to said first delayed signal for producing a second delayed signal, wherein each of said second plurality of digital delay means is clocked at the data rate; and
logic means responsive to said first and second delayed signals for logically relating said signals input thereto and for producing a data signal representing the information.

13. The differential phase shift keyed demodulator of claim 12 wherein the first and second delayed signals are binary signals, and wherein the logic means performs modulo-2 addition, and wherein the logic means performs a majority detection on the modulo-2 sums for determining the majority binary bit in the sums, wherein the majority binary bit represents the information.

14. The differential phase shift keyed demodulator of claim 10 wherein the third means includes:
first delay means responsive to the data signal and clocked by the clock signal for producing a first delayed data signal;
inverter means responsive to the clock signal for producing an inverted clock signal;
second delay means responsive to the data signal and clocked by the inverted clock signal for producing a second delayed signal;
third delay means responsive to the second delayed signal and clocked by the clock signal for producing a third delayed signal;
logic means responsive to said first delayed data signal and said third delayed data signal for logically relating the signal's input thereto to produce a control signal; and
voltage-controlled oscillator means for producing an oscillating signal in response to said control signal, wherein said control signal controls the frequency of oscillation of said voltage-controlled oscillator means, and wherein the clock signal is derived from said oscillating signal.

15. The differential phase shift keyed demodulator of claim 14 wherein when the first delayed data signal is a zero the control signal is in a non-effective state such that there is no change in the frequency of oscillation of the voltage-controlled oscillator means, and wherein when the first delayed data signal is a binary one and the third delayed data signal is a binary zero the control signal causes a slowdown in the frequency of the oscillating signal, and wherein when the first delayed data signal is a binary one and the third delayed data signal is a binary one the control signal causes an increase in the frequency of the oscillating signal.

16. The differential phase shift keyed demodulator of claim 14 including a filter disposed between the logic means and the voltage-controlled oscillator means to smooth the control signal and limit the amount of noise injected into the voltage-controlled oscillator means.

17. The differential phase shift keyed demodulator of claim 14 wherein the center frequency of the voltage-controlled oscillator means is twice the clock frequency of the different phase shift keyed demodulator, and including a divide-by-two circuit means for dividing the signal produced by the voltage-controlled oscillator means to produce the clock signal for the different phase shift keyed demodulator.

18. A method for recovering information from a differential phase shift keyed modulated signal, said method including the steps of:
(a) dividing the XY vector phase into a plurality of sectors, wherein each one of said plurality of sectors is assigned a code and determining the sector in which the instantaneous phase of the phase modulated signal lies at a given time; and
(b) comparing the instantaneous phase of the phase modulated signal at successive times, by comparing the code of the sector in which the instantaneous phase of the phase modulated signal lies at successive times, wherein the phase difference, as determined by the phase modulated signal being in different sectors, represents the information.

19. The method of claim 18 wherein step (a) includes:
generating a plurality of threshold boundaries passing through the origin of the XY vector phase plane, wherein each threshold boundary divides the XY vector phase plane into two half-plane segments; and
for each one of said plurality of threshold boundaries, determining in which half-plane segment the instantaneous phase lies such that the overlapping area of the half-plane segments in which the instantaneous phase lies identifies the sector of the XY vector phase plane in which the instantaneous phase lies.

20. The method of claim 19 wherein the plurality of threshold boundaries include three threshold boundaries offset by 120°.

21. The method of claim 18 wherein the step (a) includes:
producing a plurality of reference signals wherein there is a predetermined phase angle between each reference signal;
mixing each one of said plurality of reference signals and the modulated signal for producing a plurality of mixed signals; and
producing a threshold signal in response to each one of said plurality of mixed signals wherein the aggregate of said plurality of threshold signals indicates the sector in which the instantaneous phase lies.

22. The method of claim 21 wherein the plurality of reference signals includes three reference signals with a 120° phase difference between each reference signal, and wherein the plurality of mixed signals includes three mixed signals, and wherein the plurality of threshold signals includes three threshold signals, wherein each threshold signal is produced by comparing the corresponding mixed signal to ground to produce the threshold signal.

23. The method of claim 21 wherein the step (b) includes:
delaying said plurality of threshold signals to produce a plurality of delayed threshold signals; and
logically relating each of said plurality of delayed threshold signals representing the instantaneous phase at a first identified time, and the threshold signals representing the instantaneous phase at a second identifiable time to produce a signal representing the information.

24. The method of claim 23 wherein the information signal includes a plurality of bits and each one of the plurality of threshold signals is delayed one bit time.

25. The method of claim 23 wherein the delayed threshold signal representing the instantaneous phase at the first identifiable time and the threshold signal representing the instantaneous phase at the second identifiable time are binary signals, and wherein the delayed threshold signal and the threshold signal are logically related by performing modulo-2 addition and determining the majority binary bit in the modulo-2 sums, wherein the majority binary bit represents the information.

26. A method for recovering information from a differential phase shift keyed modulated signal and for providing a synchronized clock signal, said method including the steps of:

(a) dividing the XY vector phase plane into a plurality of sectors and determining the sector in which the instantaneous phase of the phase modulated signal lies, wherein each one of said plurality of sectors is assigned a code;

(b) comparing the sector code in which the instantaneous phase lies at successive predetermined times, wherein the result of said comparison produces a data signal representing the information; and (c) determining the sector in which the instantaneous phase lies at successive predetermined times, wherein the result of said determination provides the synchronized clock signal.

27. The method of claim 26 wherein the step (a) includes:

generating a plurality of threshold boundaries passing through the origin of the XY vector phase plane, wherein each threshold boundary divides the XY vector phase plane into two half-plane segments; and for each of said threshold boundaries, determining in which half plane segment the instantaneous phase lies such that the overlapping area of the half-plane segments in which the instantaneous phase lies identifies the sector of the XY vector phase plane in which the instantaneous phase lies, and producing a plurality of binary signals, wherein each of said plurality of binary signals represents the half-plane segment in which the instantaneous phase lies.

28. The method of claim 27 wherein the step (b) includes:

delaying the plurality of binary signals representing the half-plane segment in which the instantaneous phase lies, to produce a plurality of first delayed signals, and wherein the delay time equals twice the data rate;

delaying said first delayed signal to produce a plurality of second delayed signals, wherein the delay time equals the data rate; and logically relating said plurality of first and second delayed signals to produce a data signal representing the information.

29. The method of claim 28 wherein the first and second delayed signals are binary signals, and wherein the step of logically relating the first and second delayed signals includes performing modulo-2 addition, and determining the majority binary bit in the modulo-2 sums, wherein the majority binary bit in the modulo-2 sums, wherein the majority binary bit represents the information.

30. The method of claim 26 wherein step (c) includes:

delaying the data signal by the clock rate to produce a first delayed data signal;

inverting the clock signal to produce an inverted clock signal;

delaying the data signal by said inverted clock signal to produce a second delayed data signal;

delaying said second delayed signal by the clock rate to produced a third delayed data signal;

logically relating said first delayed data signal and said third delayed data signal to produce a control signal;

producing an oscillating signal, wherein said control signal controls the frequency of oscillation of said oscillating signal; and deriving the clock signal from said oscillating signal.

31. The method of claim 30 wherein when the first delayed data signal is a zero the control signal is in a non-effective state such that there is no change in the frequency of the oscillating signal, and wherein when the first delayed data signal is a binary one and the third delayed data signal is a binary zero the control signal decreases the frequency of the oscillating signal, and wherein when the first delayed data signal is a binary one and the third delayed data signal is a binary one the control signal increases the frequency of the oscillating signal.

32. The method of claim 31 including the step of filtering the control signal to limit the amount of noise injected into the oscillating signal.

33. The method of claim 30 wherein the center frequency of the oscillating signal is twice the clock frequency and including the step of dividing the oscillating signal by two to produce the clock signal.

* * * * *